(12) United States Patent
Narayanan Thangaraj et al.

(10) Patent No.: US 12,219,580 B2
(45) Date of Patent: Feb. 4, 2025

(54) METHODS, APPARATUS, AND SYSTEMS FOR RESOURCE ALLOCATION FOR MULTIMEDIA BROADCAST MULTICAST SERVICE (MBMS) IN WIRELESS SYSTEMS

(71) Applicant: IDAC HOLDINGS, INC., Wilmington, DE (US)

(72) Inventors: Yugeswar Deenoo Narayanan Thangaraj, Conshohocken, PA (US); Ghyslain Pelletier, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 411 days.

(21) Appl. No.: 17/785,384

(22) PCT Filed: Dec. 17, 2020

(86) PCT No.: PCT/US2020/065451
§ 371 (c)(1),
(2) Date: Jun. 14, 2022

(87) PCT Pub. No.: WO2021/127069
PCT Pub. Date: Jun. 24, 2021

(65) Prior Publication Data
US 2023/0029998 A1  Feb. 2, 2023

Related U.S. Application Data

(60) Provisional application No. 62/951,038, filed on Dec. 20, 2019.

(51) Int. Cl.
*H04W 72/30* (2023.01)
*H04W 4/06* (2009.01)
*H04L 12/18* (2006.01)

(52) U.S. Cl.
CPC ............. *H04W 72/30* (2023.01); *H04W 4/06* (2013.01); *H04L 12/189* (2013.01)

(58) Field of Classification Search
CPC ........ H04W 72/30; H04W 4/06; H04L 12/189
See application file for complete search history.

(56) References Cited

U.S. PATENT DOCUMENTS

| | | | |
|---|---|---|---|
| 2019/0174440 A1 | 6/2019 | Kwak et al. | |
| 2021/0051616 A1* | 2/2021 | Park | H04J 11/0069 |
| 2022/0109963 A1* | 4/2022 | Li | H04W 72/30 |

FOREIGN PATENT DOCUMENTS

| | | |
|---|---|---|
| EP | 3 166 272 A1 | 5/2017 |
| EP | 3 745 785 A1 | 12/2020 |
| WO | WO 2019/190247 A1 | 10/2019 |

\* cited by examiner

*Primary Examiner* — Farid Seyedvosoghi
(74) *Attorney, Agent, or Firm* — Flaster Greenberg P.C.

(57) ABSTRACT

Methods, apparatus, systems, architectures, and interfaces for receiving a Multimedia Broadcast Multicast System (MBMS) service performed by a wireless transmit receive unit (WTRU) are provided. A method may include any of: receiving MBMS service configuration information including information indicating, for an MBMS service, an association between a transmission mode (TM) and a bandwidth part (BWP); receiving the MBMS service using a first BWP according to the received MBMS service configuration information; detecting a trigger for changing use of a BWP from using the first BWP to using a second BWP for receiving the MBMS service; determining a TM associated with the second BWP according to an association between a TM and the second BWP, according to an association indicated by the information included in the MBMS service configuration information; and receiving the specific MBMS service via the second BWP according to the TM associated with the second BWP.

15 Claims, 7 Drawing Sheets

METHODS, APPARATUS, AND SYSTEMS FOR RESOURCE ALLOCATION FOR MULTIMEDIA BROADCAST MULTICAST SERVICE (MBMS) IN WIRELESS SYSTEMS

CROSS-REFERENCE TO RELATED APPLICATIONS

This application is the 371 National Stage of International Application No. PCT/US2020/065451, filed Dec. 17, 2020, which claims priority to U.S. Provisional Application No. 62/951,038, filed Dec. 20, 2019, the disclosures of which are incorporated herein by reference in their entireties.

BACKGROUND

The present invention relates to the field of computing and communications and, more particularly, to methods, apparatus, systems, architectures and interfaces for computing and communications in an advanced or next generation wireless communication system, including communications carried out using a new radio and/or new radio (NR) access technology and communication systems. Such NR access and technology may be referred to as 5G, and may provide edge computing, which may also be referred to as fog networking and/or ubiquitous computing. For example, use cases such as Multimedia Broadcast Multicast Service (MBMS), automation of vehicles, such as cars and drones, real-time Augmented Reality (AR), immersive gaming, etc., represent only a few technologically advanced use cases that may need edge computing, for example, for low latency support. Although implementation of such use cases has been attempted using conventional network capabilities and technologies, such implementations remain scarce and available with limited features, for example, in controlled environments and/or using specialized hardware. For example, implementation of MBMS using conventional network capabilities and technologies may be limited in any of applicability and features, for example, due to conventional network capabilities, configurations, and requirements.

BRIEF DESCRIPTION OF THE DRAWINGS

A more detailed understanding may be had from the following description, given by way of example in conjunction with the accompanying drawings, wherein like reference numerals in the figures indicate like elements, and wherein.

EXAMPLE NETWORKS FOR IMPLEMENTATION OF THE EMBODIMENTS

Figure 1A:
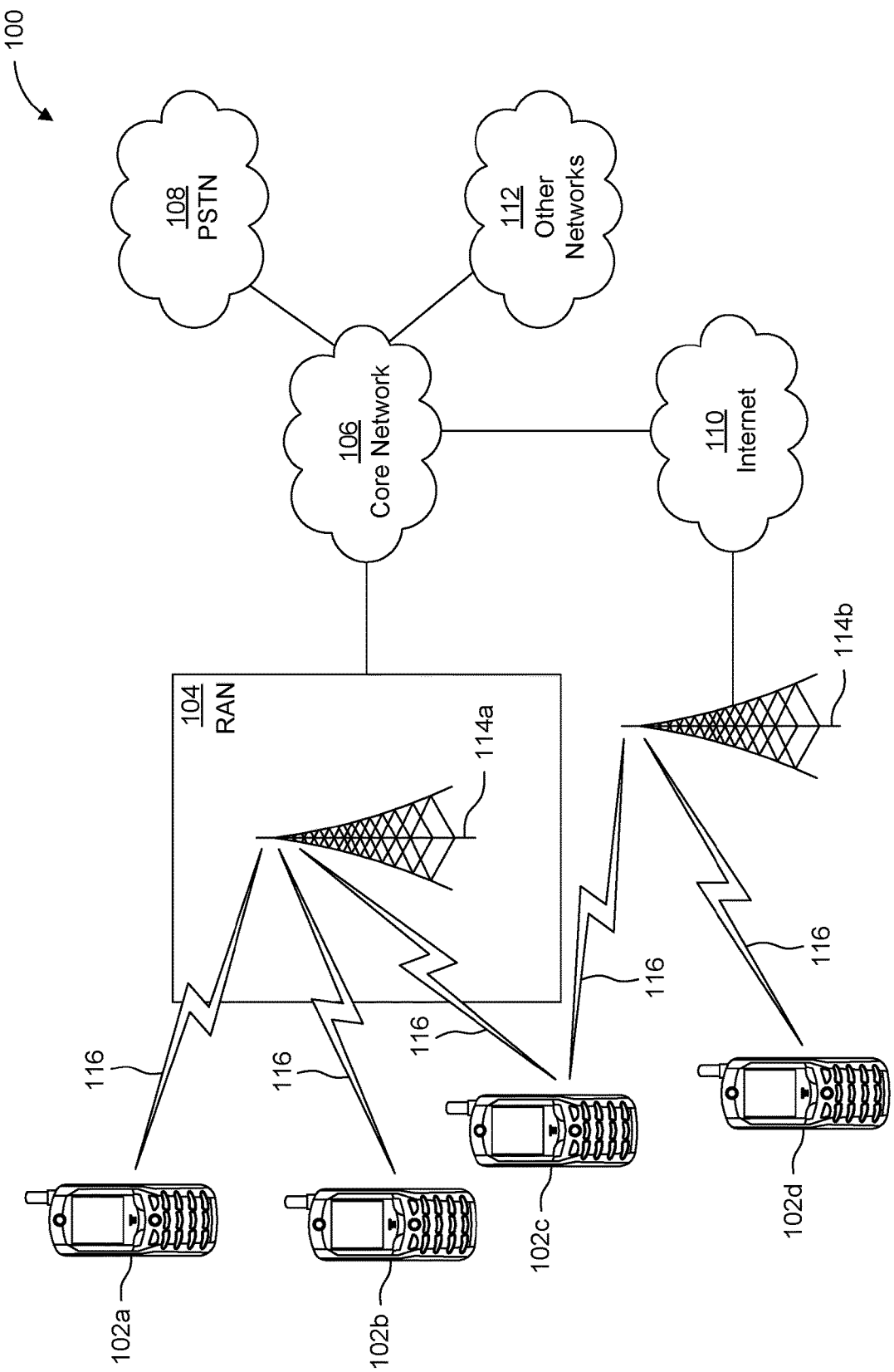
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., a eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
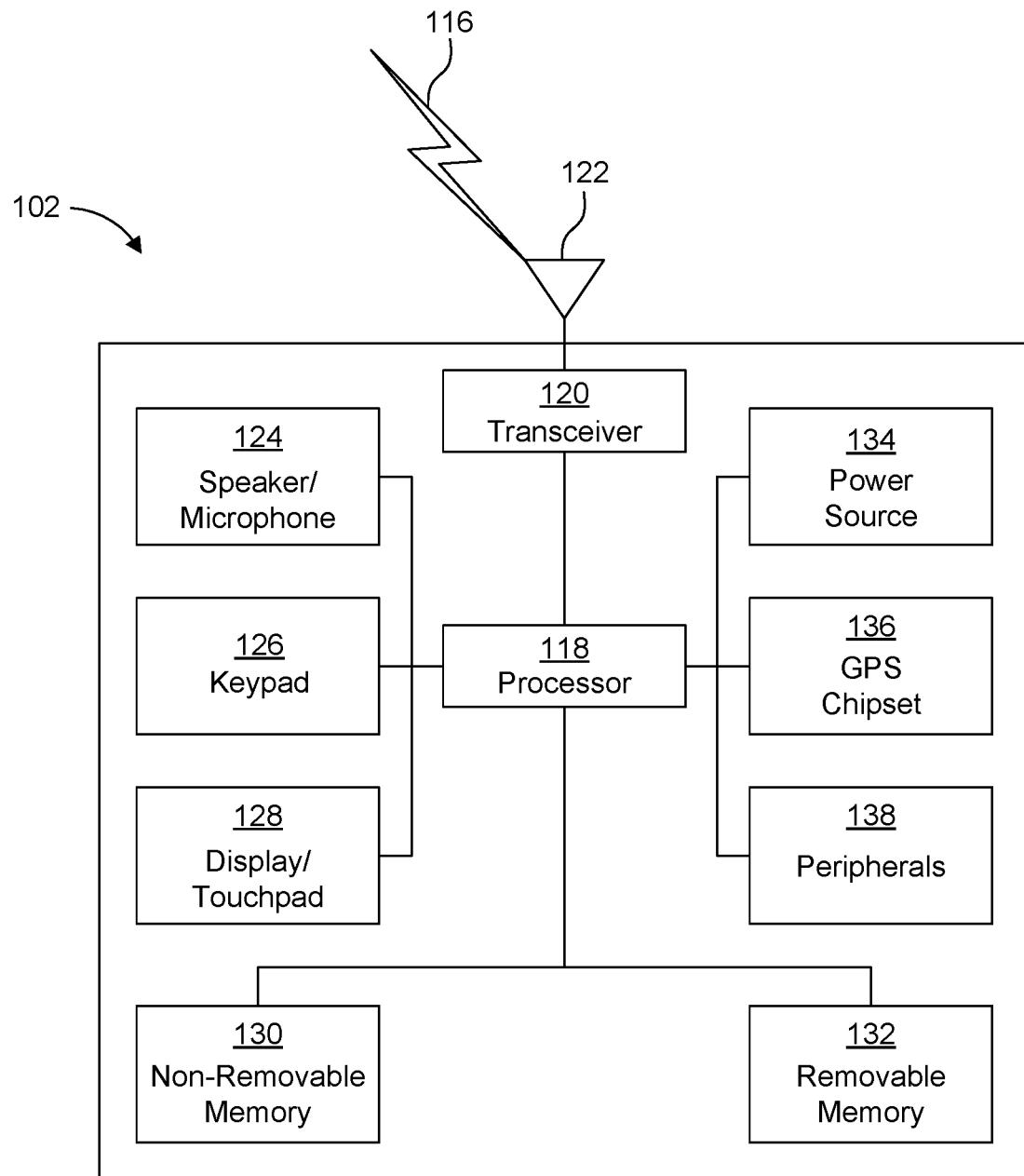
FIG. 1B is a system diagram illustrating an example wireless transmit/receive unit (WTRU) that may be used within the communications system illustrated in FIG. 1A according to an embodiment.
Figure 1C:
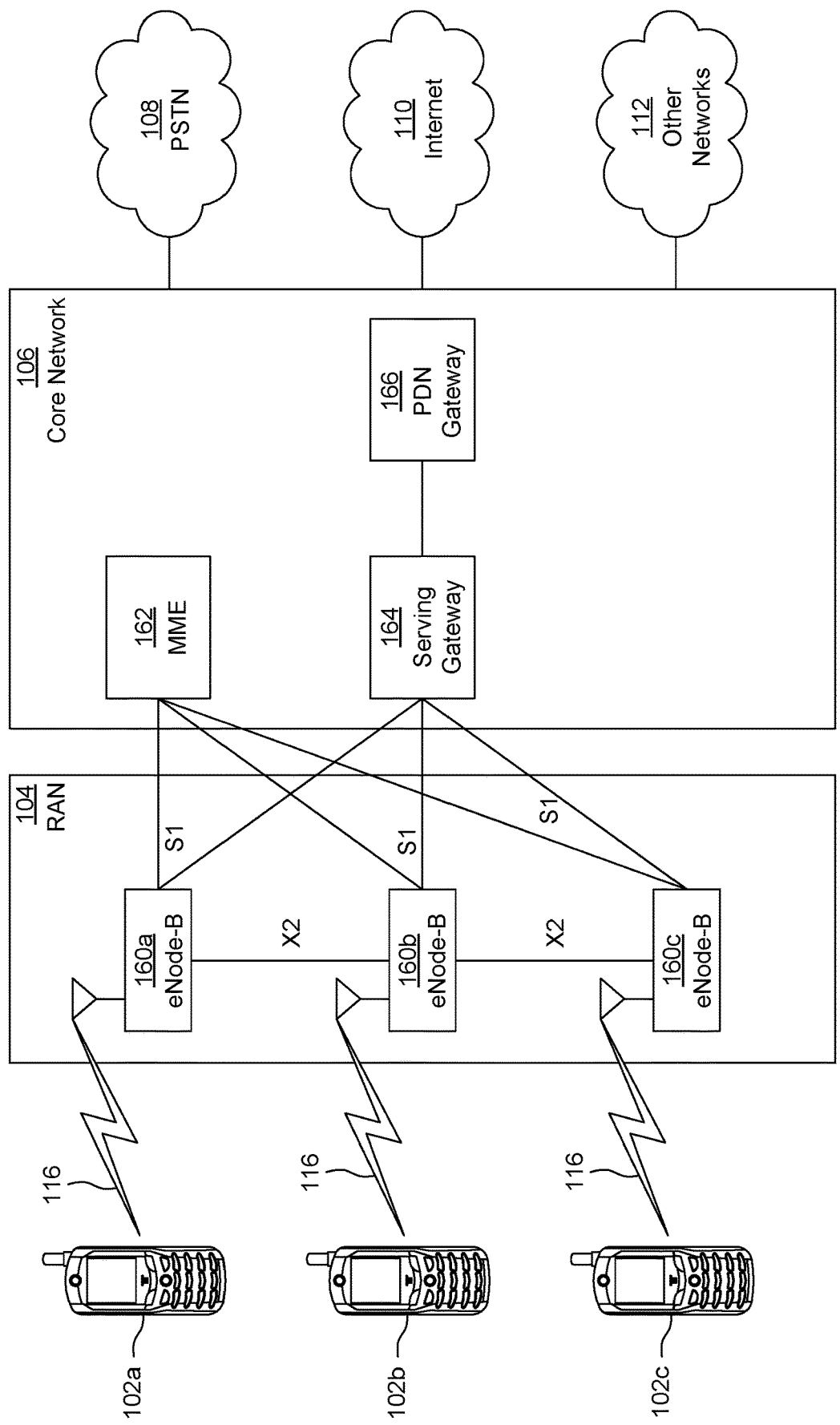
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
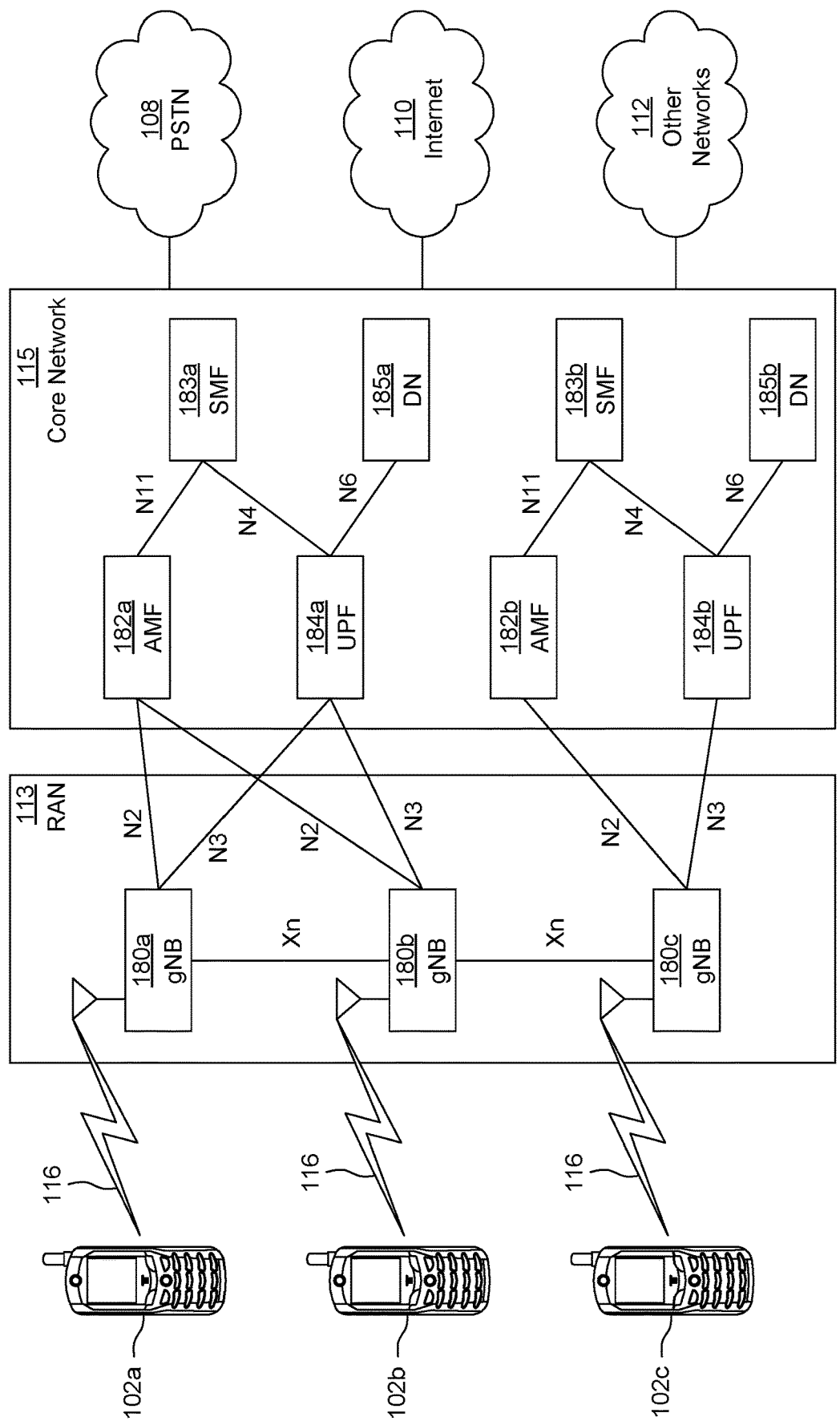
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

Multimedia Broadcast Multicast System (MBMS)

Multimedia Broadcast Multicast System (MBMS) services may be delivered over communication networks, such as wireless networks, using a variety of methods, for example, including via any of Unicast Cellular (UC) transmissions, Multicast-Broadcast Single Frequency Network (MBSFN) transmissions, and Single Cell Point To Multipoint (SC-PTM) transmissions.

In the case of SC-PTM, broadcast/multicast (e.g., broadcast and/or multicast) services are supported over a single cell, and a broadcast/multicast area is dynamically adjusted per cell (e.g., cell by cell) according to users' distribution. SC-PTM transfers broadcast/multicast services using a shared channel (e.g., an LTE downlink shared channel, such as a Physical Downlink Shared Channel (PDSCH)), and such shared channel is scheduled using a (e.g., common) RNTI for a group of users (e.g. a group-RNTI). SC-PTM scheduling may be considered as agile, for example, because radio resources may be dynamically assigned in time and frequency domain by control channel (e.g., a Physical Downlink Control Channel (PDCCH)) based on real time traffic load and may be dynamically assigned per TTI (e.g., on a per TTI basis, TTI by TTI). SC-PTM is suitable for scenarios where a broadcast/multicast service is expected to be delivered to a limited number of cells, for example, in a case where user interests and the concerned cells may dynamically change due to user movement. SC-PTM allows efficient radio utilization and flexible deployment of a number of applications, such as, for example, critical/emergency communications, traffic information for cars (e.g., Vehicle-to-Anything (V2X) services), and on-demand TV services, etc.

In the case of MBSFN, transmissions from different cells are arranged to be identical and time aligned and transmissions from different cells appear as a single transmission when received by a WTRU. In order to enable time synchronization among base stations (e.g., eNBs, gNBs, APs, etc.), a MBSFN area and a MBSFN Synchronization Area are defined. An MBSFN Area is a group of cells, within an MBSFN Synchronization Area of a network, and which are coordinated to achieve an MBSFN Transmission. MBMS architecture includes (e.g., defines) various logical entities for performing network functions applicable for MBMS transmission. For example, a Multi-cell/Multicast Coordination entity (MCE) performs any of: admission control, deciding whether to use SC-PTM or MBSFN, and suspension and/or resumption of/for MBMS services, etc. An MBMS Gateway (MBMS-GW) performs session control signaling and forwards MBMS user data to eNBs via IP multicasting.

In the case of MBMS in LTE, MBMS supports unicast, SC-PTM, and MBSFN transmissions. Further, in the case of MBMS in LTE, frequency domain resource allocation is not supported, as the MBMS transmission takes up a whole bandwidth (BW). Such design of MBMS in LTE is inefficient in deployments with large bandwidths, for example, because LTE MBMS resource allocation is fairly semistatic. In the case of MBMS in LTE, the WTRU acquires MBMS information following sequential reception of configuration and/or scheduling information on System Information Block 2 (SIB2), then SIB13, then on a Multicast Control Channel (MCCH), and (e.g., finally) reception of a Multicast Traffic Channel (MTCH).

MBMS in New Radio (NR)

According to embodiments, there may be a plurality of use cases and/or deployments for MBMS in wireless networks, such as new radio (NR) and/or 5th Generation (5G) networks, that is, for use of MBMS services in NR and/or 5G networks (herein, any of NR, NR networks, 5G, and 5G networks may be used interchangeably). While not limiting scope or applicability to (e.g., other, similar, etc.) wireless systems, networks, and delivery methods, a transmission mode, for example, as referred to herein, may refer to (e.g., encompass, and/or include, etc.) a variety of transmissions methods, for example, such as any of unicast, multicast (e.g., SC-PTM), broadcast (e.g., SFN), and mixed-mode (e.g., a WTRU receives both: unicast, and at least one of multicast or broadcast). There may be a case of a receive-only mode, such as, for example, a special case of non-unicast modes. In such a case, a sidelink (SL) interface (e.g., for a sidelink transmission, that is, for direct WTRU-to-WTRU communications) may be a special case of a transmission mode. A transmission mode may be used for delivery of services with different QoS, such as, for example, eMBB, URLLC, and/or MBMS services. A transmission mode may be used for delivery of services to one (e.g., unicast) or multiple receivers (e.g., multicast, groupcast or broadcast). Examples of services to/for multiple users include V2X services (e.g., groupcast) and MBMS services (e.g., multicast, broadcast). The terms MBMS mode and MBMS transmission mode may also be used interchangeably, for example, herein, to refer to a WTRU's transmissions mode.

According to embodiments (while not limiting scope or applicability to other, similar, etc., wireless systems, networks, and delivery methods for MBMS data and/or control information), a WTRU may be configured to operate with a (e.g., certain, given, etc.) transmission mode to exchange MBMS-related data, and may have (e.g., further) configuration aspects, for example, for the delivery of MBMS services. According to embodiments, such an aspect may be the mapping of data bearers (e.g., and/or of signaling bearers), for example, for configured transmission method(s) to exchange MBMS-related data. As an example, such mapping may be for the L2 bearer configuration for MBMS. A WTRU may be configured for mixed-mode transmissions (e.g., unicast and multicast), with delivery of MBMS data being performed (e.g. transmitted) only using multicast (and/or broadcast) transmissions, with other services being transmitted over unicast (e.g., eMBB, URLLC). For example, a WTRU may be configured for mixed-mode transmissions (e.g., unicast and multicast) with the delivery of MBMS data performed using both unicast and multicast transmissions, irrespective of whether the WTRU is (e.g., actively) using other services (e.g., using unicast transmissions, such as eMBB, URLLC, etc.).

According to embodiments, use cases and deployments for MBMS in NR are discussed hereinbelow. NR and/or 5G may support any of the following use cases: (1) V2X, sidelink and public safety; (2) Internet of Things (IoT) (e.g., NB IoT and eMTC) devices (e.g. needing software updates) for smart grids, utilities, laboratories, industry, infrastructure, residences, etc.; (3) television and radio services (e.g., video and audio services) in 5G, such as for example, linear TV, live TV, smart TV, managed and OTT content distribution, radio services, etc.; (4) push services, such as, for example, news, advertisements, and weather broadcast); (5) ethernet broadcast/multicast for factory automation; and (6) extended reality, group gaming, etc. In the case of V2X, sidelink and public safety, there may be a requirement (e.g., need) that resources are efficiently used for information distributed to large numbers of WTRUs supporting V2X applications. In the case of television and radio services in 5G, such may include any of: (1) video distribution (e.g., when multiple users are concurrently watching the same live streaming); (2) large peaks in concurrent consumption of OTT services via unicast media streams; and (3) and immersive six degree of freedom (6DoF) volumetric streaming (e.g., content/video that is much larger than traditional flat, or even 360-degree videos).

According to embodiments, any of NR and 5G may include any of the following enablers (e.g., and/or requirements): (1) service switching between any of unicast, multicast/broadcast, and/or mixed mode operation; (2) dynamic control of any of transmission area and transmission resources; (3) reliability of MBMS transmissions; and (4) devices deployed for any of MBMS transmission (e.g., MBMS transmitters) and MBMS reception (e.g., MBMS receivers). In a case of service switching between unicast, multicast/broadcast and mixed mode operation, a change in service may be triggered according to (e.g., based on, due to) any of the following reasons: (1) WTRU mobility, (2) user activity, (3) WTRU density, and (4) link condition.

In a case of (e.g., an enabler for) service switching associated with WTRU mobility, there may be any of the following scenarios for a mode switch (e.g., any of which may be with or without service continuity, lossy or lossless): (1) a change to/from any of unicast and SC-PTM; (2) a change to/from any of unicast and MBSFN; (3) a change to/from any of (e.g., a first) SC-PTM and (e.g., a second) SC-PTM; (4) intra-eNB/intra-MBMS area inter-cell mobility; (5) inter-eNB/intra-MBMS area inter-cell mobility; (6) inter-MBMS area mobility; (7) inter-RAT mobility with change of transmission mode; and (8) inter-RAT mobility without change of transmission mode.

In a case of WTRU mobility, an aspect (e.g., challenge) may be enabling service continuity for any of idle mode and inactive WTRUs. In a case service switching associated with user activity, users may interact with a playback function and have some control over the media stream. Further, in such a case, end users may interact with live or shared content, for example, via an uplink channel to increase user engagement and possibilities for monetization (e.g., use cases such as video distribution, advertising, and public safety use cases). In a case service switching associated with WTRU density, there may be changes in the number of users acquiring and receiving a MBMS service. In such a case, a threshold may be met, wherein system efficiency may be increased by changing to MBMS transmission mode. Further, in such a case of WTRU density, there may be a mode (e.g., transmission mode) change with respect to any of V2X proximity and WTRU range within an area. In a case service switching associated with link condition, there may be different characteristics, for example, for (e.g., between) resources for multicast and unicast transmissions (e.g., for a given WTRU), and a quality (e.g., a link condition) may become lower for some characteristics (e.g., for multicast resources), for example, as compared to other characteristics (e.g., for unicast transmissions).

In a case of (e.g., an enabler for) dynamic control of transmission (e.g., delivery) area and/or transmission resources, such may be done for (e.g., according to, based on, etc.) any of the following reasons: (1) regional TV/radio services occurring at certain times of the day; (2) any of fluctuation and variation in on-demand MBMS services (e.g., in terms of services with support for uplink data, or in terms of support for higher reliability); and (3) a target area for group communication and live video may be available for an area (e.g., a specific place), and/or a trigger for (e.g., associated with) an event (e.g., a target area may change due to mobility of interested users). In terms of timescale, a change in SFN area may be slower than adjusting resources between any of unicast, multicast, and broadcast.

In a case of (e.g., an enabler for) reliability of MBMS transmissions, an MBMS service may support application level retransmissions. However, reliability and efficiency tradeoffs of (e.g., offered by) application level methods may be costly, for example, in terms of spectrum efficiency. Furthermore, application level methods may not be enough to meet lower latency requirements. That is, different MBMS services might have different latency, efficiency and reliability requirements. Additionally, a drawback of previous MBMS releases was severe degradation with (e.g., due to) doppler, which makes such difficult to use in high speed environments. According to embodiments, in a case of reliability of MBMS transmissions, any of the following use cases may be considered: (1) power grid distribution (e.g., with a delay of 5 ms and packet error rate of 10e-6), and (2) V2X (e.g., a latency of 20 ms is required for information sharing between WTRUs and RSUs); and (3) requirements for MCPTT (e.g. a mouth-to-ear latency of 300 ms).

In a case of (e.g., an enabler for) types of devices in scope, types of devices that may be deployed as MBMS receivers include any of Read-Only Mode (ROM) WTRUs (e.g., that are not capable and/or expected to perform uplink transmissions for acquiring and receiving MBMS transmissions) through WTRUs implementing more complex functionality (e.g., including functions and procedures using uplink transmissions). In addition, WTRUs implementing more complex functions may support any of carrier aggregation, dual connectivity, multiple radio interfaces active concurrently, and (e.g., concurrent) operation across different frequency ranges (e.g., FR1 and FR2).

Methods for Resource Allocation for MBMS

According to embodiments, any of methods, operations, features, devices, and elements described herein may be described with respect to transmissions and delivery of MBMS services. However, the present disclosure is not limited thereto, and any of methods, operations, features, devices, and elements described herein may be described with respect to transmissions and delivery of MBMS services that are not limited to scenarios and/or use cases discussed and/or described herein. According to embodiments, any of methods, operations, features, devices, and elements described herein with respect to transmissions and delivery of MBMS services may be applicable to any type of transmissions and/or services, including but not limited to any of: V2X, extended reality, gaming, IoT/MTC, industrial use cases, etc.

According to embodiments, (e.g., different) functions and/or procedures of a NR system may be augmented with (e.g., enablement of, enablers for, etc.) functionality for any of seamless change of MBMS transmission mode, dynamic allocation of resources for any MBMS transmission mode, and support for high transmission reliability and/or high service reliability. According to embodiments, a physical layer may be augmented with (e.g., enablement of, enablers for, etc.) functionality (e.g., as described hereinbelow) for features for NR MBMS, such as, for example, features related to any of scheduling of and/or allocation of resources for MBMS transmissions. According to embodiments, there may be enablers for MBMS downlink transmissions to a WTRU, for example, to add support for mixed-mode transmissions (e.g., MBMS services only, or MBMS and unicast services) within (e.g., using) a same set of resources or using different sets of resources, for example, fora cell (e.g., same or different BWPs) and/or for different cells (e.g., using any of carrier aggregation or dual connectivity principles) within the same and/or different frequency ranges (e.g., FR1 and FR2).

According to embodiments, layer 2 (L2), such as a MAC layer, may be augmented with (e.g., enablement of, enablers for, etc.) functionality (e.g., as described hereinbelow) for features for (e.g., features providing) NR MBMS for MAC operation. For example, such may be enablers for (e.g., providing) any of: (1) BWP operation (e.g., MBMS-only BWP or mixed-mode BWP operation); (2) single cell operation (e.g., either: BWP-based for any of single and multiple BWP, or not BWP-based); (3) carrier aggregation operation; and (4) dual connectivity operation (e.g., for NR-dual connectivity (DC), MR-DC, NE-DC or EN-DC).

According to embodiments, L2 (e.g., a MAC layer) may be augmented with enabling functionality to address aspects (e.g., challenges) for NR MBMS for (e.g., data) radio bearer operation (e.g., mDRB). For example, such may be (e.g., specific) enablers for (e.g., providing) handling radio bearers for the MBMS service, for example, in support of any of different MBMS modes and reliability. Such functionality (e.g., enablers, features, operations, procedures, etc.) may include (e.g., provide) bearer handling at (e.g., upon, on condition of, after, etc.) any of a change of transmission mode and a change of L2 configuration, for example, for MBMS services. According to embodiments, such enablers (e.g., features) may include (e.g., provide) a DL DRB split (e.g., splitting of a DL DRB), for example, for (e.g., certain) modelling of the MBMS delivery, which may be for DC support and/or for (re-)transmissions of MBMS-related data across a (e.g., different) cell group (e.g., or different cell groups). According to embodiments, such enablers (e.g., features) may include (e.g., provide) any of access stratum level security management, and split DL MBMS bearer operation.

WTRU Configuration for MBMS

According to embodiments, a transmission mode may be characterized by (e.g., using, based on, etc.) physical transmission attributes, which may be (e.g., further) configuration aspects (e.g., parameters) of a WTRU. According to embodiments, physical transmission attributes (e.g., characterizing a transmission mode) may include and/or be associate with any of the following: (1) waveform; (2) numerology; (3) physical downlink control channel; (4) physical downlink data channel; (5) control channel structure; (6) cell or multi-cell transmission; (7) physical uplink control channel; (8) physical uplink data channel; (9) (e.g., MBMS) data radio bearer (e.g., mDRB); (10) (e.g., MBMS) signaling radio bearer (e.g., mSRB); and (11) feedback.

According to embodiments, in a case of a waveform attribute, such may be a waveform associated with a transmission, for example, OFDM, DFT-S-OFDM, etc. According to embodiments, for a numerology attribute, such may be a numerology associated with a transmission, for example, Subcarrier spacing (SPS), Cyclic prefix (CP), Transmission Time Interval (TTI), etc. According to embodiments, for a physical downlink control channel attribute, such may be any of: a type of physical control channel associated with the transmission (e.g., PDCCH or a control channel dedicated for MBMS scheduling), a mapping to time/frequency resource elements, DCI formats, etc. According to embodiments, in a case of a physical downlink data channel attribute, such may be any of a type of physical channel associated with the transmission (e.g., PDSCH, a channel dedicated for MBMS transmissions, etc.), a mapping to time and/or frequency resource elements, a scrambling, an MCS, etc. According to embodiments, in a case of a control channel structure attribute, such may be control channel configuration aspects, such as, for example, any of control channel format, control resource set (CORESET), search space, aggregation level, scheduling periodicity, scheduling offset etc. According to embodiments, in a case of a cell transmission and/or a multi-cell transmission, such may be associated with (e.g., information indicating) any of: whether a coverage of MBMS transmission may limited to a single cell, or whether synchronous transmission may be (e.g., assumed to exist) in a (e.g., preconfigured) area, for example, consisting of two or more cells.

According to embodiments, in a case of a physical uplink control channel attribute, such may be any of a type of physical control channel associated with uplink transmissions for control information (e.g., PUCCH or a control channel dedicated for MBMS uplink control information), a mapping to time and/or frequency resource elements, UCI formats, etc. According to embodiments, in a case of a physical uplink data channel attribute, such may be any of a type of physical channel associated with uplink transmissions for data-like information (e.g., PUSCH or a channel dedicated for MBMS uplink transmissions), a mapping to time and/or frequency resource elements, a scrambling, a MCS, etc. According to embodiments, such a channel (e.g., for data-like transmissions) may be (e.g., useful) for any of MBMS sessions control, quality of experience reporting, UCI, user plane transmission status reporting, etc. According to embodiments, in a case of a mDRB attribute, a WTRU may be configured with a data radio bearer and associated with a MBMS service. In such a case, a mDRB may be configured, for example, with a non-transparent RLC mode (e.g., RLC UM) and Packet Data Convergence Protocol (PDCP). An mDRB may be an instance of a DRB, and for example, may have (e.g., may inherit) any number of properties of unicast DRBs, such as, for example, priorities, LCH restrictions for uplink transmissions, and PDCP SR configuration for DL status reporting. According to embodiments, an mDRB may have a security context separate (e.g., different) from other (m)DRBs, for example, such as a security context that is specific to any of a (e.g., given) MBMS service and MBMS mode.

According to embodiments, in a case of an mSRB attribute, a WTRU may be configured with a signaling radio bearer (e.g., mSRB), which may be associated with a MBMS service. An mSRB may have a separate security context from other (m)SRBs, for example, such as a security context that is specific to any of a (e.g., given) MBMS service and MBMS mode. According to embodiments, a mSRB may support procedures related to MBMS service continuity, such as, for example, retransmission requests, change and/or reconfiguration of MBMS mode, security key update, mobility-related aspects, etc. For example, support of MBMS service continuity may be (e.g., used, useful, needed, etc.) for a case of (e.g. for when) a network entity, which may be a separate/different entity from the network RRC entity, manages MBMS-specific aspects of the MBMS operation, for example, using group common MBMS control plane signaling. According to embodiments, in a case of a feedback attribute, such may be any of a (e.g., type of) need for and/or a type of UL feedback, for example, associated with the MBMS transmission. According to embodiments, a WTRU may be configured to not transmit UL feedback. According to embodiments, the WTRU may be configured to transmit transmission-related feedback (e.g., CSI, HARQ, etc.). According to embodiments, a WTRU may be configured to transmit data plane related feedback (e.g., RLC status report, PDCP status report, etc.).

According to embodiments, a WTRU may be configured to receive MBMS transmissions via (e.g., using) unicast transmissions. For example, a WTRU may be configured to receive MMBS transmissions based on (e.g., according to) SC-PTM transmissions. According to embodiments, a WTRU may be configured to receive MBMS transmissions via Single Frequency Network (SFN) transmissions. For example, a WTRU may be configured to receive multicast transmissions with at least one physical transmission attribute different than unicast transmission. According to embodiments, a WTRU may be configured to receive MBMS transmissions using (e.g., via) non-unicast transmissions (e.g., the initial transmission for each data packet) and using (e.g., via) unicast transmissions (e.g., for retransmissions and/or for uplink control and/or session information).

MBMS Data Radio Bearer (mDRB)

According to embodiments, a WTRU may be configured (e.g., for reception of data) for a MBMS service and may be configured with a data radio bearer (DRB) dedicated to the MBMS reception (e.g., a DRB dedicated as a mDRB). As referred to herein, a MBMS service and a mDRB may be considered equivalent and may be referred to interchangeably, for example, when discussed herein with reference to any of a L2 and a layer 3 (L3) perspective. According to embodiments, a MBMS service may be configured with any number of (e.g., zero, one or more, sets of, etc.) mDRBs.

According to embodiments, a WTRU may configure a mDRB for a MBMS service. According to embodiments, a WTRU may configure a mDRB for a MBMS service in a case where any of: (1) the WTRU is configured for mixed-mode operation and/or in a case where the WTRU is configured with at least one DRB for unicast services; (2) the MBMS service supports uplink transmission of data associated with the MBMS service; (3) L2 security (e.g., encryption and/or authentication) is configured for the MBMS service; and (4) the MBMS service supports retransmission of L2 PDUs and/or SDUs. According to embodiments, a WTRU may reconfigure a mDRB according to any of the following (e.g., upon at least one of the following occurring): (1) a WTRU applies a change of transmission mode for MBMS; (2) a WTRU does any of reconfigure, activate, and deactivate L2 security; and (3) a WTRU determines that there is a security-related problem (e.g., a failure to correctly decipher and/or authenticate a PDU for MBMS, for example, for an amount of time).

According to embodiments, in a case of the WTRU applying a change of transmission mode for MBMS, the WTRU may be reconfigured with (e.g., may reconfigure itself for) support for out-of-order delivery, for example, upon a change to a transmission mode supporting more than one data channel (e.g., initial transmissions of SDUs using a non-unicast mode, and retransmissions of SDUs using unicast transmissions). According to embodiments, a WTRU may reconfigure a mDRB from a non-transparent RLC mode (e.g., RLC UM) to a transparent mode (e.g., RLC TM), and may initiate a recovery procedure (e.g., involving retransmissions). That is, for example, a recovery procedure may be initiated in case of (e.g., upon) a change of an operating transmission mode from a unicast mode to any of a non-unicast mode or a mixed-mode of operation. According to embodiments, in a case of any of a WTRU reconfigures, activates, or deactivates, L2 security, the WTRU may apply new security keys (e.g., group key, session key or a WTRU-specific key), and/or the WTRU may determine that sequencing (e.g., if applicable) wraps around.

According to embodiments, a WTRU may determine that a change in transmission mode occurs according to other methods described herein. According to embodiments, a WTRU may apply any of the procedures, operations, methods, and features discussed herein, for example, with respect to any of a DRB and a mDRB, may be applied to any of a signaling radio bearer (SRB) and a MBMS SRB (mSRB), for example, in a case of such configuration.

MBMS Service Acquisition

According to embodiments, a WTRU may be configured to acquire a MBMS transmission resource. According to embodiments, acquisition of a MBMS transmission resource may be (e.g., include, involve, comprise, according to, based on, associated with, etc.) any of the following: (1) a WTRU receiving any of a MBMS configuration and a MBMS radio bearer configuration, (2) a WTRU applying the configuration associated with a (e.g., relevant) MBMS service, (3) a WTRU monitoring for a start of a MBMS service, (4) a WTRU switching to and/or activating a (e.g., corresponding) MBMS transmission resource(s), and (5) a WTRU starting monitoring of control channels associated with MBMS, for example, in a case where (e.g., MBMS) transmissions are started and/or ongoing.

Figure 2:
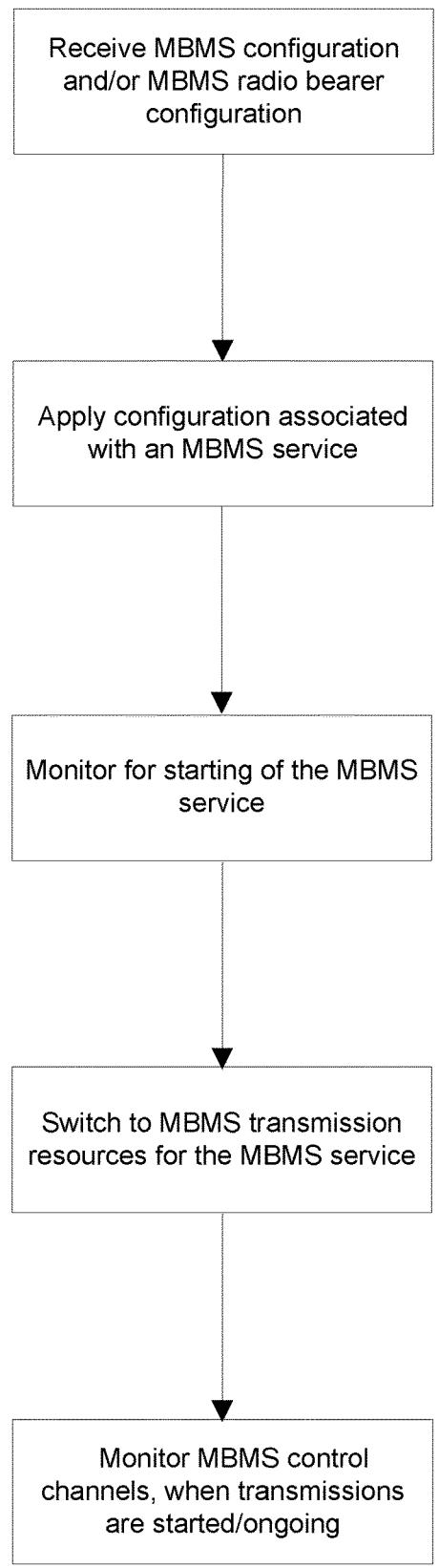
FIG. 2 is a diagram illustrating a WTRU acquiring a MBMS transmission resource, according to embodiments.

FIG. 2 is a diagram illustrating a WTRU acquiring a MBMS transmission resource, according to embodiments.

According to embodiments, as a first operation, for example, referring to FIG. 2, a WTRU may receive any of a MBMS configuration and a MBMS radio bearer configuration. According to embodiments, as a second operation, a WTRU may apply a configuration associated with a (e.g., certain, specific, selected, determined, indicated etc.) MBMS service, and, as a third operation, a WTRU may monitor for a start of the MBMS service. According to embodiments, as a fourth operation, a WTRU may switch to (e.g., activate) MBMS transmission resource(s), for example, resources corresponding to the MBMS service. According to embodiments, as a fifth operation, a WTRU may (e.g., start to) monitor control channels associated with MBMS (e.g., the MBMS service), for example, in a case where transmissions are started and/or ongoing.

According to embodiments, acquisition of a MBMS transmission resource may be triggered. For example, according to embodiments, a WTRU may be configured with triggers for acquisition of a MBMS transmission resource. According to embodiments, a WTRU may be configured to acquire a MBMS transmission resource when MBMS reception is requested (e.g., from higher layers). For example, according to embodiments, a WTRU may acquire a MBMS transmission resource in a case where MBMS reception is requested and active transmission resources (e.g. BWP, secondary cell (SCell), Primary SCell (PSCell), PCell, etc.) are not associated with a (e.g., corresponding) MBMS configuration. According to embodiments, a WTRU may be configured to acquire a MBMS transmission resource according to any of: (1) a start of a MBMS service, (2) a change of a MBMS transmission mode, (3) an explicit indication from a network, (4) a cell selection, (5) a cell reselection, (6) a return from out of coverage, (6) a reconfiguration with sync completion, and (7) receiving an indication of change in MBMS configuration. According to embodiments, a WTRU may be configured to acquire a MBMS BWP, wherein a MBMS BWP may be different than any of an initial BWP and some other BWP, such as a first active BWP.

MBMS Service Area Acquisition

According to embodiments, a WTRU may be configured to acquire a MBMS configuration. According to embodiments, a WTRU may perform any of the following: (1) (e.g., first) acquire timing and synchronization for a (e.g., given) set of physical resources (e.g., a cell), (2) acquire system frame numbering (SFN), (3) perform beam management (if applicable), and/or (4) acquire and start decoding a control channel. According to embodiments, a MBMS configuration may be broadcast(ed). According to embodiments, a WTRU may acquire a MBMS configuration using (e.g., via, from, etc.) any of a cell-based broadcasted System Information (e.g., SysInfo, or SIBx for MBMS) and a separate set of resources dedicated to MBMS configuration.

According to embodiments, a MBMS configuration may be received (e.g., by a WTRU) on-demand. For example, a WTRU may be configured to obtain MBMS configuration using an on-demand request procedure. According to embodiments, an on-demand request may be based on transmission of a preamble associated with a MBMS configuration. According to embodiments, (e.g., different, separate, unique, etc.) preambles may be configured for any of different MBMS transmission modes and different MBMS services. According to embodiments, an on-demand request may be based on transmission of an radio resource control (RRC) request message. According to embodiments, such a RRC request message may provide further information about any of: MBMS services of interest, WTRU capability (e.g., regarding MBMS transmission modes), link quality, RRM measurement results of neighbor cells, etc.

According to embodiments, a MBMS counting procedure and on-demand request procedure may be combined into a single procedure. According to embodiments, a WTRU may request (e.g., for) a MBMS configuration and/or a MBMS service in any of an RRC connection request, a RRC connection re-establishment message, and a RRC resume message. According to embodiments, a WTRU may be configured to receive a MBMS configuration in any of system information (e.g., a SIB) or in an RRC response (e.g. a MSG4, or similar). According to embodiments, a WTRU may receive a response in a current active BWP, and the response may indicate (e.g. command) a WTRU to switch to a BWP associated with a MBMS service. In such a case, a WTRU may (e.g., then) receive a MBMS configuration in the (e.g., switched to) MBMS BWP. According to embodiments, a response to an on-demand request (e.g., from a WTRU executing an on-demand request procedure) may be a RRC response message configuring the WTRU to enter connected state to receive MBMS service.

Figure 3:
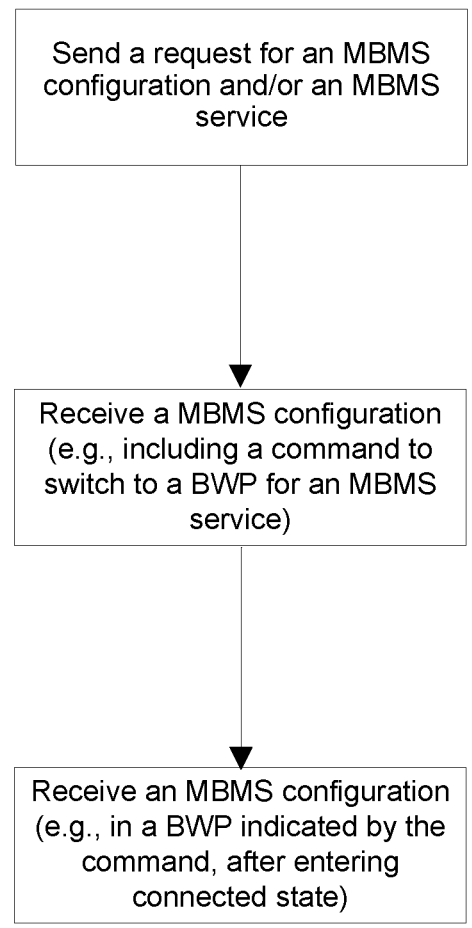
FIG. 3 is a diagram illustrating an MBMS counting procedure and on-demand request procedure as a single procedure, according to embodiments.

FIG. 3 is a diagram illustrating an MBMS counting procedure and on-demand request procedure as a single procedure, according to embodiments.

According to embodiments, as a first operation, for example, referring to FIG. 3, a WTRU may send a request (e.g., transmit a message including and/or indicating a request) for any of an MBMS configuration and an MBMS service, for example, in any of an RRC connection request message, a RRC connection re-establishment message, and a RRC resume message. According to embodiments, such request may be an on-demand request. According to embodiments, as a second operation, a WTRU may receive a MBMS configuration in any of system information or an RRC response, and for example, such system information and/or response may be received in an active BWP. According to embodiments, such system information and/or response may include information commanding the WTRU to switch (e.g., from the active BWP) to a BWP associated with a (e.g., specific) MBMS service. According to embodiments, such response to an on-demand request (e.g., from a WTRU executing an on-demand request procedure) may be a RRC response message for configuring the WTRU to enter connected state, for example, to receive MBMS service. According to embodiments, as a third operation, for example, in a case where a WTRU has entered a connected state, the WTRU may receive a MBMS configuration, for example in the MBMS BWP associated with (e.g., instructed/indicated in) the command.

According to embodiments, a WTRU may receive a MBMS configuration according to conditions, for example, such that the MBMS configuration reception (e.g., acquisition by the WTRU) may be a conditional acquisition. According to embodiments, a WTRU may be configured to receive MBMS configuration as a part of a conditional reconfiguration message. According to embodiments, a WTRU may start MBMS acquisition when one or more trigger conditions are satisfied. For example, such trigger conditions may be associated with unicast transmission, and/or such trigger conditions may be dedicated to (e.g., associated only with) MBMS transmissions.

Resource Allocation for MBMS

According to embodiments, MBMS transmission resources may be a set(s) of time and/or frequency resources (e.g., PRB(s), BWP(s), cell(s), etc.). According to embodiments, a WTRU may be configured with any number of sets of time/frequency resources for MBMS transmissions. According to embodiments, such set of resources may be associated to any of a (e.g., specific) MBMS service, a mDRB (e.g., if configured), and a mSRB (e.g., if configured). According to embodiments, such a set of resources may correspond to any of the following of a WTRU's configuration: a set of one or more PRBs, a BWP, a serving cell (e.g., a PCell, SCell, PSCell, etc.), and resources for sidelink. Availability of such resources may vary in time.

According to embodiments, MBMS resources may be acquired, for example, by a WTRU. According to embodiments, a WTRU may be configured to acquire and/or receive control information for (e.g., further) configuring any number of data channels associated with any number of MBMS service(s). According to embodiments, a WTRU may acquire such configuration from reception of system information for a cell (e.g., MBMS SIBx) and/or for an area using any of broadcasted and dedicated signaling. According to embodiments, such transmission may use any of dynamically scheduled resources or semi-statically configured resources. For example, a WTRU may receive such control information and/or data from a preconfigured MBMS transmission resource. According to embodiments, a WTRU may determine a MBMS transmission resource to receive a (e.g., specific) MBMS service based on any of: a preconfigured association between the MBMS transmission resource and the MBMS configuration, and a preconfigured association between the MBMS transmission resource and the MBMS radio bearer configuration.

According to embodiments, there may be a variety of features for resource configuration, for example, as discussed below. According to embodiments, a WTRU may be configured with a plurality of MBMS transmission resources, wherein different MBMS transmission resources may be associated with different MBMS services having differentiated (e.g., different) QoS requirements. According to embodiments, a WTRU may be configured with a plurality of MBMS transmission resources, wherein different MBMS transmission resources may be associated with different MBMS transmission modes. According to embodiments, MBMS transmission resources may have specific numerology. According to embodiments, use of specific numerology may be for any of: enabling (e.g., using) transmission characteristics (e.g. numerology) that may be different than that for unicast transmissions; performing transmissions within a desired bandwidth; supporting coordination of transmissions between multiple transmission points; supporting interference management; and supporting WTRUs with different capabilities (e.g., in terms of maximum supported bandwidth).

According to embodiments, a MBMS transmission resource may be multiplexed with resources for unicast transmissions (e.g., or not multiplexed with (such) resources). According to embodiments, a MBMS transmission resource may be not multiplexed with unicast transmission resources, for example, by configuring unicast transmission resources and MBMS transmission resources in different and/or disjointed sets of resources. Sets of resources may be disjointed in any of time and/or frequency. According to embodiments, a MBMS configuration associated with a MBMS transmission resource may be applicable in a logical area, for example, an area including more than one cell. For example, such a MBMS configuration may support SFN transmission mode.

According to embodiments, any of a MBMS transmission mode and a MBMS configuration may be determined according to a MBMS transmission resource. According to embodiments, a WTRU may determine an applicable transmission mode, for example, associated with a set of MBMS transmission resources (e.g. PRBs, BWPs, SCell, PSCell, PCell, etc.). According to embodiments, a WTRU may reconfigure the transmission mode, for example, in a case of (e.g., upon) activation and/or change of MBMS transmission resources. For example, such reconfiguration may occur according to any of: a change of any of a BWP, a BWP timer expiry, a SCell activation, and a SCell deactivation, for example, by any of signaling, a timer expiry, etc.; reconfiguration of a SCG; and application of a conditional reconfiguration (e.g., a conditional handover). According to embodiments, a WTRU may be configured with mixed-mode and/or with resources that support multiplexing of unicast, and may be configured for MBMS transmissions. According to embodiments, such a WTRU may apply a reconfiguration that changes the resources for unicast transmissions (e.g., change of BWP, SCell activation status, etc.). In such a case, a WTRU may initiate a similar reconfiguration for the MBMS transmission mode and/or MBMS resources.

According to embodiments, MBMS transmission resources may correspond to a BWP. According to embodiments, a WTRU may be configured acquire a BWP for MBMS transmissions. According to embodiments, a BWP (e.g., acquired by a WTRU for MBMS transmission) may be different than an initial BWP of the WTRU's configuration for the cell, or it may be different than a first active BWP. According to embodiments, a WTRU may be configured with any number of BWPs for MBMS transmissions, wherein any number of such BWP(s) may be (e.g., respectively, each, uniquely, etc.) associated with a MBMS configuration. According to embodiments, a MBMS configuration for different BWPs may support and/or configure different transmission modes. According to embodiments, a WTRU may be configured to acquire (e.g., change to) a BWP associated with a MBMS configuration. For example, such WTRU may change a BWP in a case of higher layers initiating access to a MBMS service, such as a case where the active BWP is not associated with the corresponding MBMS configuration. According to embodiments, a WTRU may be configured to acquire and/or change to a MBMS BWP according to any of: (1) starting MBMS service, (2) changing MBMS transmission mode, (3) explicit indication from the network, (4) cell selection, (5) cell reselection, (6) returning from out of coverage, (7) reconfiguration with sync completion, and (8) receiving an indication of change in MBMS BWP configuration.

According to embodiments, MBMS transmission resources may correspond to a SCell. According to embodiments, a WTRU may receive configuration of any number of SCells, for example, as a part of a cell group configuration (e.g., in the form of SCellAddModList). According to embodiments, any number of such SCells may be associated with a MBMS configuration (e.g., a MBMS SCell), or in other words, such SCells may be configured with MBMS transmission resources. According to embodiments, a SCell configuration may be a part of (e.g., included in) a dedicated RRC configuration. According to embodiments, a WTRU may receive such SCell configuration via MBMS system information (e.g., a MBMS SIBx). According to embodiments, a WTRU may be (e.g., further) provided with an indication whether such SCells are in activated or deactivated state. In a case where such indication is not provided, a WTRU may consider the SCell to be in activated state and the WTRU may start receiving MBMS services via the configured SCell.

According to embodiments, activation status of a SCell may be based on a MBMS transmission. According to embodiments, a WTRU may determine an activation state of a SCell according to a status of MBMS transmission resources on the SCell. According to embodiments, in a case of a WTRU preconfigured with a MBMS SCell in a deactivated state, upon receiving indication that MBMS services is started, the WTRU may activate the corresponding SCell. According to embodiments, a WTRU may consider MBMS transmissions in a SCell as started according to receiving a SCell activation MAC control element for a MBMS SCell. According to embodiments, a WTRU may receive an interest notification for a (e.g., specific) MBMS service from higher layers. In such a case, a WTRU may be configured to select a (e.g., preconfigured) SCell associated with such MBMS service, and the WTRU may activate such MBMS SCell.

According to embodiments, MBMS transmission resources may correspond to a PSCell. According to embodiments, a WTRU may receive a secondary cell group configuration, wherein a PSCell may be associated with a MBMS service. According to embodiments, a WTRU may store the secondary cell group (SCG) configuration and may apply the secondary cell group configuration according to a preconfigured condition associated with the MBMS transmission status being satisfied. For example, according to embodiments, a WTRU may be configured to perform a PSCell addition if a preconfigured condition is met, wherein the PSCell may be associated with MBMS transmission resources and the condition may correspond to any of MBMS service activation or MBMS interest notification from higher layers.

Change of MBMS Transmission Mode

According to embodiments, a WTRU may determine a MBMS transmission mode according to changing of MBMS transmission resources. According to embodiments, a WTRU may be configured with a first MBMS transmission resource and a second MBMS transmission resource, wherein each of the first and second MBMS transmission resources may be associated with respective (e.g., different) transmission modes. According to embodiments, a WTRU may be configured to monitor for changes in MBMS transmission resources. According to embodiments, in a case of (e.g., upon a WTRU detecting) a change from a first MBMS transmission resource to a second transmission resource, a WTRU may apply a (e.g., corresponding) change in a MBMS transmission mode.

According to embodiments, MBMS transmission resources may correspond to a BWP. According to embodiments, a WTRU may determine a change in MBMS transmission mode according to a BWP switch. According to embodiments, a WTRU may be configured to monitor for changes in an active BWP part, wherein a BWP change may be triggered by a BWP switch command. According to embodiments, such command may be received via PDCCH, for example, indicating any of: a DL assignment, a UL grant, a BWP inactivity timer, RRC signaling, and a random-access procedure. In such a case, for example, upon detecting any of a switch, a command, or a change in a BWP, a WTRU may acquire and/or apply the MBMS configuration associated with a new BWP. If no MBMS configuration is associated with the new BWP, then the WTRU may trigger a MBMS BWP acquisition procedure.

According to embodiments, a WTRU may determine a change in MBMS transmission mode according to a BWP switch being triggered, and, in such a case, a new active BWP may be configured with a MBMS transmission mode, for example, that is different than the MBMS transmission mode for the previously active BWP. According to embodiments, a BWP switch may indicate a change in any of a set of PRBs or numerology for a (e.g., given) MBMS service. According to embodiments, a BWP switch may indicate a change in MBMS transmission mode for a (e.g., given) set of PRBs. According to embodiments, a WTU may be configured to apply a MBMS configuration according to a WTRU switching to a BWP that supports MBMS transmissions of interest, for example, from a BWP that doesn't support MBMS transmissions of interest. According to embodiments, a WTRU may be configured to acquire a MBMS BWP according to the WTRU switching to a BWP that doesn't support MBMS transmissions of interest, for example, from a BWP in which the WTRU was actively receiving MBMS transmissions of interest. According to embodiments, a WTRU may assume that MBMS transmissions are no longer supported in a serving cell, for example, according to the WTRU switching the BWP not associated with a MBMS configuration.

Figure 4:
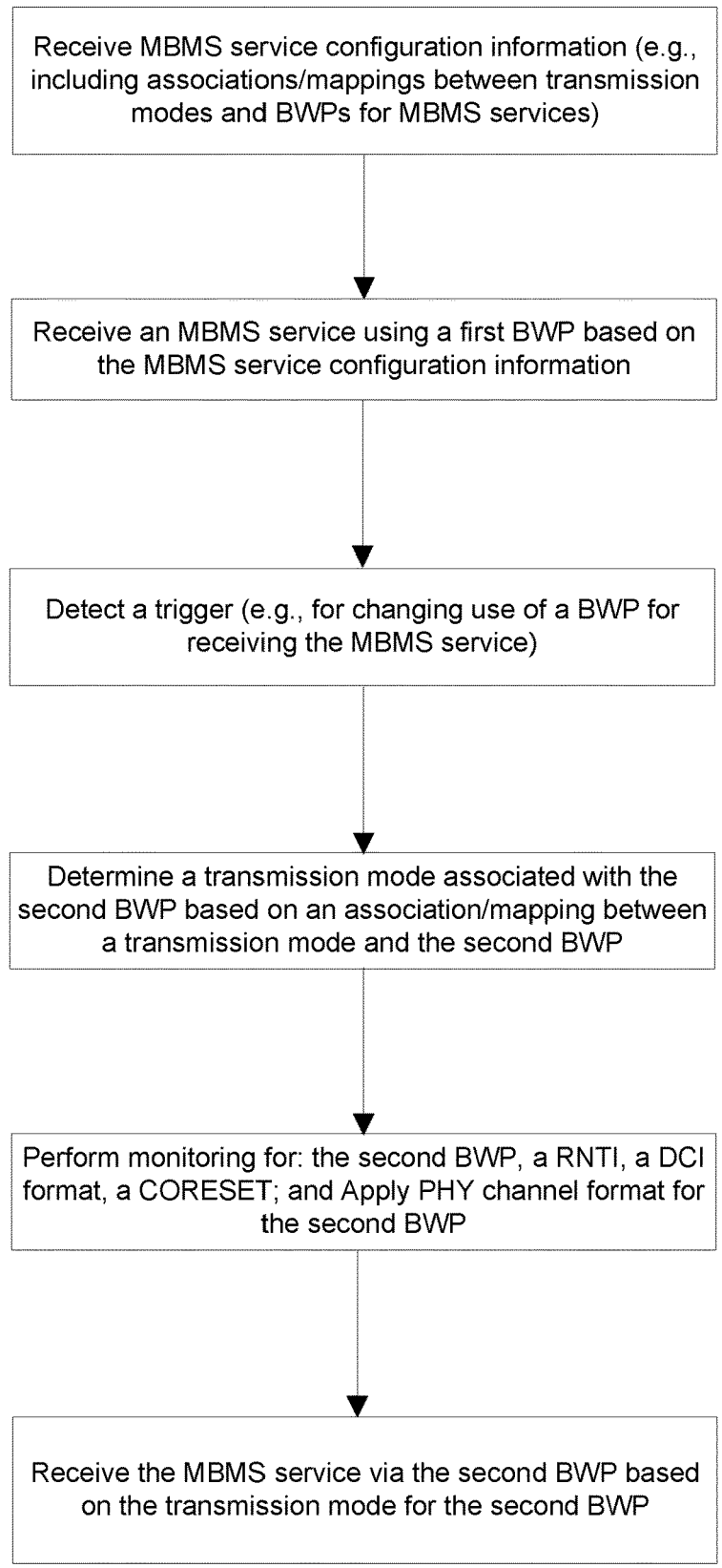
FIG. 4 is a diagram illustrating receiving an MBMS service, according to embodiments.

FIG. 4 is a diagram illustrating receiving an MBMS service, according to embodiments.

According to embodiments, as a first operation, for example, referring to FIG. 4, a WTRU may receive MBMS service configuration information for any number of MBMS services. According to embodiments, such MBMS service configuration information may include information indicating an association between a transmission mode and a BWP, for example, for any (e.g., number of, each of, etc.) MBMS service(s). According to embodiments, as a second operation, a WTRU may receive an MBMS service using a first BWP, for example, according to received MBMS service configuration information. According to embodiments, as a third operation, a WTRU may detect (e.g., determine) occurrence of a trigger (e.g., a condition), for example, for (e.g., causing, instantiating, effectuating, etc.) changing use of a BWP, for example, from use of a first (e.g., active) BWP to use of a second BWP (e.g., as instructed, indicated, configured, etc.) for receiving a MBMS service.

According to embodiments, as a fourth operation, a WTRU may determine a transmission mode associated with a second BWP, for example, according to an association (e.g., mapping information, a linkage information, correspondence information, etc.) between a (e.g., certain) transmission mode and the second BWP (e.g., as indicated by the information included in the MBMS service configuration information). According to embodiments, as a fifth operation, a WTRU may perform monitoring (e.g., sensing) for any of the second BWP, a RNTI, a DCI format, and a CORESET, for example, according to a RNTI. According to embodiments, such RNTI may be determined according mapping information indicating an association between a transmission mode and a BWP. Further, a WTRU may apply a physical channel format associated with the second BWP, for example, to switch use to the second BWP. According to embodiments, as a sixth operation, a WTRU may receive a (e.g., specific) MBMS service via the second BWP, for example, according to (e.g., using) the transmission mode associated with the second BWP.

According to embodiments, a WTRU may be configured to monitor for a BWP switch command, for example, which may be any of WTRU specific, group specific, cell specific, and MBMS service specific. According to embodiments, a WTRU may be configured to monitor for (e.g., receive) a BWP switch command addressed to more than one WTRU. Such a BWP switch command may be specific to a group of WTRUs (e.g. addressed by a group RNTI). According to embodiments, such a BWP switch command may be cell specific, and may be applicable to all WTRUs active in a BWP addressed by a (e.g., reserved RNTI). According to embodiments, such a BWP switch command may be MBMS service specific. According to embodiments, a BWP switch command may be common to any number of WTRUs, and such a BWP switch command may be received via a common control channel (e.g. a group and/or common PDCCH). According to embodiments, in any of the above discussed signaling methods, a PDCCH carrying a BWP switch command may (e.g., further) indicate a MBMS service, for example, either explicitly or implicitly. According to embodiments, a WTRU may obey (e.g., follow, accept, enact, etc.) a BWP switch command (e.g., only) if the WTRU is (e.g., actively) receiving the MBMS transmissions associated with the indicated MBMS service.

According to embodiments, a WTRU behavior may be associated with a BWP switch. According to embodiments, a WTRU may be configured to perform features (e.g., steps, procedures, operations, functions, actions, etc.) for any of transitioning: (1) to a MBMS BWP from a non-MBMS BWP; (2) to a non-MBMS BWP from a MBMS-BWP; and (3) between MBMS BWPs with different MBMS transmission modes. According to embodiments, such actions for transitioning may be any of: (1) detecting a change in MBMS transmission mode; (2) applying the MBMS configuration (if present) associated with the new BWP; (3) performing a control channel monitoring procedure including determining if a RNTI specific to MBMS transmission needs to be monitored; (4) establishment and/or reconfiguration of bearers associated with MBMS transmission; and (5) applying a conditional reconfiguration if any trigger conditions are associated with the BWP switch. According to embodiments, in a case of monitoring a control channel including determining if a RNTI specific to MBMS transmission needs to be monitored, a WTRU may determine if a search space specific to MBMS transmissions needs to be monitored. For example, a WTRU may monitor a g-RNTI according to detecting that a MBMS transmission mode is for SC-PTM, and for example, the WTRU may monitor a reserved RNTI according to detecting that a MBMS transmission mode is for MBSFN.

According to embodiments, a WTRU may reconfigure a bearer for MBMS service, for example, according to detecting a change in a MBMS transmission mode. According to embodiments, a WTRU may apply radio bearer establishment procedure, for example, to start receiving a session of a MBMS service for which the WTRU is interested. According to embodiments, such radio bearers may be referred as mDRB (Multicast Data Radio Bearers). According to embodiments, a mDRB establishment procedure may involve applying (re-)configuration of PDCP, RLC, MAC and physical layers associated with an mDRB. According to embodiments, a WTRU may be configured to perform a mDRB establishment procedure according to a BWP change. For example, according to embodiments, a WTRU may be configured to perform a mDRB establishment procedure according to any of: (1) a BWP change is triggered due to a BWP switch; (2) a new BWP is associated with a different MBMS transmission mode than the old BWP; and (3) switching to a BWP associated with a MBMS transmission of interest, for example, from a BWP that is not associated with the MBMS transmission of interest. According to embodiments, a WTRU may be configured to perform a mDRB establishment by applying a stored conditional reconfiguration message (e.g., applying a trigger condition). According to embodiments, a trigger condition may be and/or correspond to any of: (1) a BWP switch to a specific BWP; (2) a change in MBMS transmission mode, and (3) a conditional reconfiguration, for example, resulting in any of mDRB reconfiguration, mDRB re-establishment, etc.

According to embodiments, a WTRU may be configured with (e.g., to handle) a timer, such as an inactivity timer. According to embodiments, such a timer may be associated with a BWP, for example, according to a type of transmission within that BWP. According to embodiments, a WTRU may be configured to suspend a timer associated with inactivity within a BWP (e.g. a bwp-InactivityTimer), for example, according to switching to a BWP associated with a MBMS service. According to embodiments, a WTRU may be configured to stop an inactivity timer according to switching to a BWP associated with a MBMS configuration. For example, a WTRU may be configured to stop an inactivity timer upon switching to a BWP in which the WTRU is actively receiving MBMS transmissions. According to embodiments, a WTRU may be configured to start an inactivity timer according to switching away from a BWP associated with a MBMS configuration and/or a MBMS transmission.

According to embodiments, a WTRU may be configured apply a value for an inactivity timer according to a type of transmission associated with a BWP. For example, a WTRU may apply an inactivity timer value preconfigured for a MBMS service if the WTRU receives MBMS transmissions from a BWP. According to embodiments, an inactivity timer value associated with MBMS service may be different than the inactivity timer value associated with unicast services. For example, according to embodiments, an adaptive inactivity timer may be modeled according to a bearer type. According to embodiments, a WTRU may apply an inactivity timer value for an mDRB that may be different than an inactivity timer value for a DRB. According to embodiments, a WTRU may be configured to switch to a second BWP according to inactivity timer expiry in a first BWP, wherein the first BWP and a second BWP may be respectively associated with different MBMS transmission modes. For example, the first BWP may be associated with any of SC-PTM or MBSFN transmission modes, and the second BWP may be associated with a unicast MBMS transmission mode.

According to embodiments, a WTRU may apply a conditional handover command according to a BWP switch being triggered. According to embodiments, a WTRU may be configured to perform a mobility procedure according to conditions associated with MBMS transmissions. According to embodiments, a WTRU may be configured to perform conditional handover according to any of the following conditions being satisfied: (1) a WTRU fails to acquire a MBMS BWP within a preconfigured time period; (2) a quality of the RS associated with MBMS transmission is and/or becomes below a preconfigured threshold; and (3) a WTRU performs a BWP switch resulting in interruption and/or unavailability of MBMS transmission. In a case of a WTRU failing to acquire MBMS BWP within a preconfigured time period, a time period may be defined from the reception of an indication from a higher layer (e.g., an application) having (e.g., associated with) interest in the MBMS service. According to embodiments, in a case where a quality of the RS associated with MBMS transmission is below a preconfigured threshold, such RS may correspond to the PDCCH DMRS associated with MBMS transmission.

According to embodiments, a BWP switch may be triggered according to a status of a MBMS service and/or transmission. According to embodiments, a WTRU may be configured to perform a BWP switch according to a status of a MBMS service and/or a MBMS transmission. For example, a WTRU's active BWP may not be associated with MBMS service that the WTRU is interested in. According to embodiments, (e.g., such) a WTRU may be (e.g., further) configured to monitor for a MBMS start indication, for example, in an active BWP. According to embodiments, according to (e.g., based on, upon, etc.) receiving a MBMS start indication, a WTRU may switch to a BWP configured with the MBMS service associated with the start indication. According to embodiments, a WTRU may be configured with a BWP associated with a (e.g., specific) MBMS service, such as, for example, a MBMS transmission and/or service (e.g., already) ongoing in such a BWP. According to embodiments, a WTRU may be active in a different BWP. In such a case, according to receiving interest in such a MBMS service, the WTRU may trigger a switch to the BWP associated with such a MBMS service. According to embodiments, a WTRU may receive an indication for interest in MBMS service from higher layers (e.g., associated with an application). According to embodiments, a WTRU may be configured to apply any of procedures described herein, for example, in a case where a WTRU detects a change in a MBMS transmission mode, for example, while operating within the same BWP. According to embodiments, the MBMS transmission mode may be (re)configured by any of RRC signaling, a MAC CE, or a DCI message.

According to embodiments, MBMS transmission resources may correspond to a SCell. According to embodiments, a WTRU may receive an explicit activation command for a MBMS SCell, for example, in a MAC control element (CE) (e.g., a MAC CE). According to embodiments, a WTRU may be configured to perform any of the following actions when a SCell associated with MBMS service is activated: (1) a WTRU may determine that the MBMS transmissions are started on such SCell; (2) a variety of actions in a case of more than one MBMS transmission resources being preconfigured for a MBMS service; and (3) in a case of more than one SCells being preconfigured for a same MBMS service, switch MBMS reception between SCells according to an activation status of those SCells.

According to embodiments, in a case where a WTRU determines that the MBMS transmissions are started on a SCell, if the WTRU is interested in the MBMS service, then it may acquire (e.g., should start acquiring) a MBMS configuration (e.g., if not provided already) and may start receiving MBMS transmissions. According to embodiments, in a case of more than one MBMS transmission resources being preconfigured for a MBMS service, including, for example, a BWP on a PCell and a MBMS SCell, according to activation of the MBMS SCell, a WTRU may perform any of the following: (1) stop MBMS reception on the BWP; (2) switch to a default BWP, for example, if no other unicast transmissions are ongoing on that BWP; (3) apply a MBMS transmission mode associated with the MBMS SCell; and (4) start MBMS reception on the SCell.

According to embodiments, in a case of more than one SCell being preconfigured for a same MBMS service, a WTRU may switch MBMS reception between SCells according to an activation status of those SCells. For example, a WTRU may be actively receiving MBMS transmissions on a first MBMS SCell, and according to receiving an activation of a second MBMS SCell, the WTRU may deactivate the first MBMS SCell and may start MBMS reception on the second MBMS SCell. According to embodiments, a WTRU may be preconfigured with a MBMS SCell in a deactivated state. In such a case, a WTRU may be configured to perform (e.g., implicit) activation of a MBMS SCell according to receiving an interest notification, for example, from higher layers for a (e.g., corresponding) MBMS service.

CONCLUSION

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a UE, WTRU, terminal, base station, RNC, or any host computer.

Moreover, in the embodiments described above, processing platforms, computing systems, controllers, and other devices including the constraint server and the rendezvous point/server containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed".

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs), Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments (e.g., only) and is not intended to be limiting. As used herein, when referred to herein, the terms "user equipment" and its abbreviation "UE" may mean (1) a wireless transmit and/or receive unit (WTRU), such as described infra; (2) any of a number of embodiments of a WTRU, such as described infra; (3) a wireless-capable and/or wired-capable (e.g., tetherable) device configured with, inter alia, some or all structures and functionality of a WTRU, such as described infra; (4) a wireless-capable and/or wired-capable device configured with less than all structures and functionality of a WTRU, such as described infra; or (5) the like. Details of an example WTRU, which may be representative of any WTRU recited herein.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

The invention claimed is:

1. A Wireless Transmit/Receive Unit (WTRU) comprising a processor and memory, the processor and memory configured to:
receive a first configuration information associated with a first bandwidth part (BWP) and a second configuration information associated with a second BWP, wherein the first configuration information associated with the first BWP indicates a first multimedia broadcast multicast service (MBMS) transmission mode information for receiving data for a first MBMS service via the first BWP, and the second configuration information associated with the second BWP indicates a second MBMS transmission mode information for receiving data for a second MBMS service via the second BWP;
receive data for the first MBMS service using the first BWP in accordance with the first MBMS transmission mode information;
detect a trigger to switch from the first BWP to the second BWP; and
receive data for the second MBMS service using the second BWP in accordance with the second MBMS transmission mode information.

2. The WTRU of claim 1, wherein:
the first MBMS service corresponds to a first radio bearer mapped to the first BWP; and
the second MBMS service corresponds to a second radio bearer mapped to the second BWP.

3. The WTRU of claim 1, wherein:
the first MBMS transmission mode information indicates that a hybrid automatic repeat request (HARQ) feedback is to be transmitted; and
the second MBMS transmission mode information indicates that the HARQ feedback is not to be transmitted.

4. The WTRU of claim 1, wherein the processor and memory are configured to:
switch from the first MBMS transmission mode to the second MBMS transmission mode based on detecting the trigger to switch from the first BWP to the second BWP.

5. The WTRU of claim 1, wherein the processor and memory are configured to:
reconfigure a radio bearer from the first bandwidth part to the second bandwidth part based on detecting the trigger to switch from the first BWP to the second BWP.

6. The WTRU of claim 1, wherein the trigger to switch from the first BWP to the second BWP comprises beginning a reception of the second MBMS service.

7. The WTRU of claim 6, wherein the second MBMS service comprises a unicast service.

8. The WTRU of claim 1, wherein the trigger to switch from the first BWP to the second BWP comprises reception quality associated with receiving data for the first MBMS service via the first BWP being below a threshold.

9. A method implemented by a wireless transmit/receive unit (WTRU), the method comprising:
receiving a first configuration information associated with a first bandwidth part (BWP) and a second configuration information associated with a second BWP, wherein the first configuration information associated with the first BWP indicates a first multimedia broadcast multicast service (MBMS) transmission mode information for receiving data for a first MBMS service via the first BWP, and the second configuration information associated with the second BWP indicates a second MBMS transmission mode information for receiving data for a second MBMS service via the second BWP;
receiving data for the first MBMS service using the first BWP in accordance with the first MBMS transmission mode information;
detecting a trigger to switch from the first BWP to the second BWP; and
receiving data for the second MBMS service using the second BWP in accordance with the second MBMS transmission mode information.

10. The method of claim 9, wherein:
the first MBMS transmission mode information indicates that hybrid automatic repeat request (HARQ) feedback is to be transmitted; and
the second MBMS transmission mode information indicates that HARQ feedback is not to be transmitted.

11. The method of claim 9, wherein the trigger comprises downlink control information (DCI) indicating a BWP change.

12. The method of claim 9, wherein the trigger comprises a BWP switch command that is common to a plurality of WTRUs.

13. The method of claim 9, wherein the trigger to switch from the first BWP to the second BWP comprises beginning reception of the second MBMS service.

14. The method of claim 13, wherein the second MBMS service comprises a unicast service.

15. A network device comprising a processor and memory, the processor and memory configured to:
- send a first configuration information associated with a first bandwidth part (BWP) and a second configuration information associated with a second BWP to a wireless transmit/receive unit (WTRU), wherein the first configuration information associated with the first BWP indicates a first multimedia broadcast multicast service (MBMS) transmission mode information for receiving data for a first MBMS service via the first BWP, and the second configuration information associated with the second BWP indicates a second MBMS transmission mode information for receiving data for a second MBMS service via the second BWP;
- send data for the first MBMS service using the first BWP in accordance with the first MBMS transmission mode information;
- send a trigger to the WTRU to switch from the first BWP to the second BWP; and
- send data for the second MBMS service using the second BWP in accordance with the second MBMS transmission mode information.

* * * * *